United States Patent [19]
Dehnert

[11] 3,871,460
[45] Mar. 18, 1975

[54] SNOWMOBILE FRAME

[75] Inventor: Douglas K. Dehnert, Thief River Falls, Minn.

[73] Assignee: Arctic Enterprises, Inc., Thief River Falls, Minn.

[22] Filed: Oct. 23, 1973

[21] Appl. No.: 408,470

[52] U.S. Cl. ................................................ 180/5 R
[51] Int. Cl. ........................................... B62d 27/02
[58] Field of Search ..................................... 180/5 R

[56]  References Cited
UNITED STATES PATENTS

| | | | |
|---|---|---|---|
| 3,435,907 | 4/1969 | Imhoff | 180/5 R |
| 3,507,346 | 4/1970 | Hauser | 180/5 R |
| 3,613,205 | 10/1971 | Takada | 180/5 R |
| 3,727,709 | 4/1973 | Newman | 180/5 R |

Primary Examiner—Philip Goodman
Attorney, Agent, or Firm—Molinare, Allegretti, Newitt & Witcoff

[57] ABSTRACT

A snowmobile frame has a pair of spaced-apart side panels extending longitudinally for substantially the entire length of the body thereof, each in a single plane. Drive components, including the drive shaft are mounted directly on the side panels.

7 Claims, 4 Drawing Figures

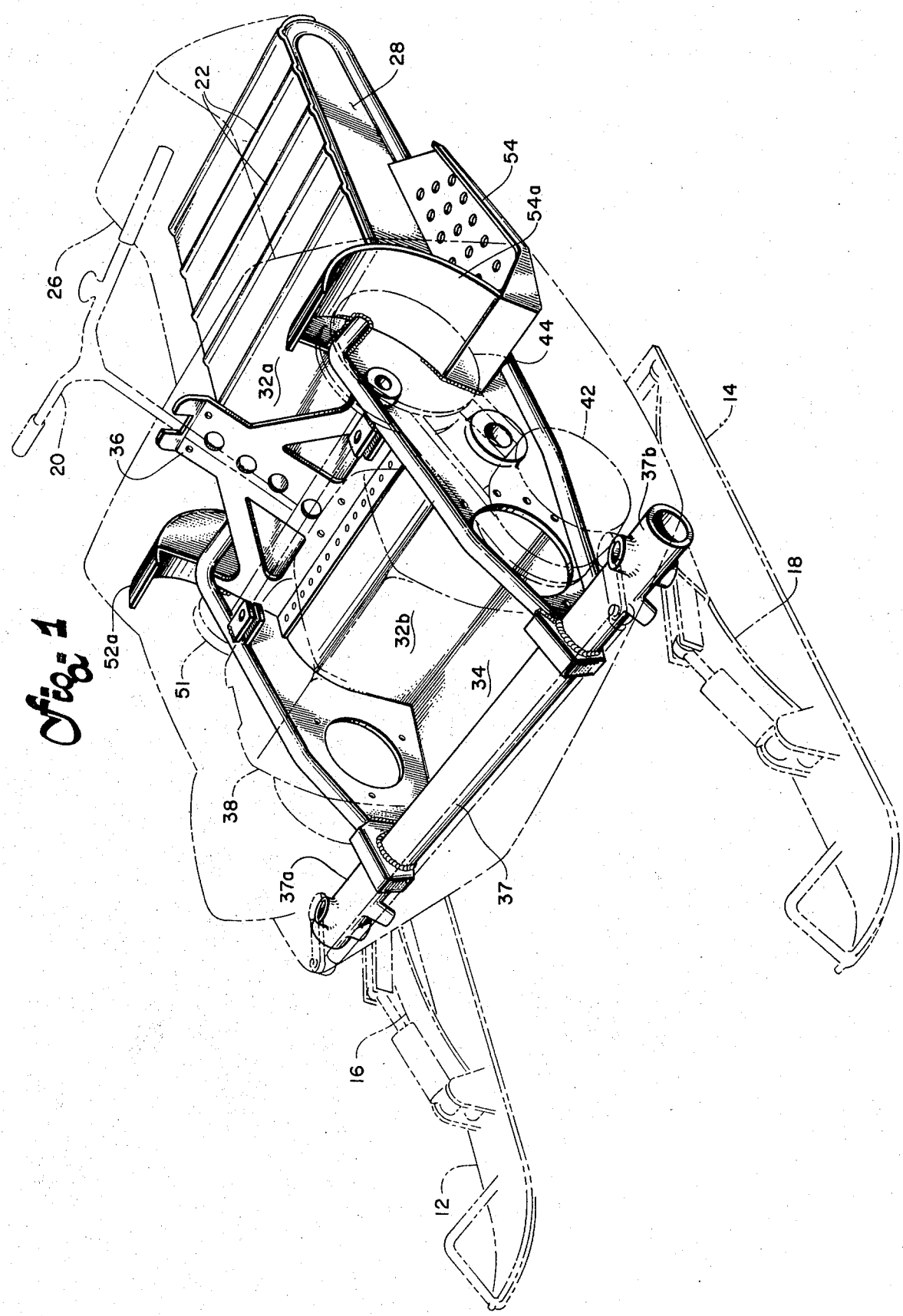

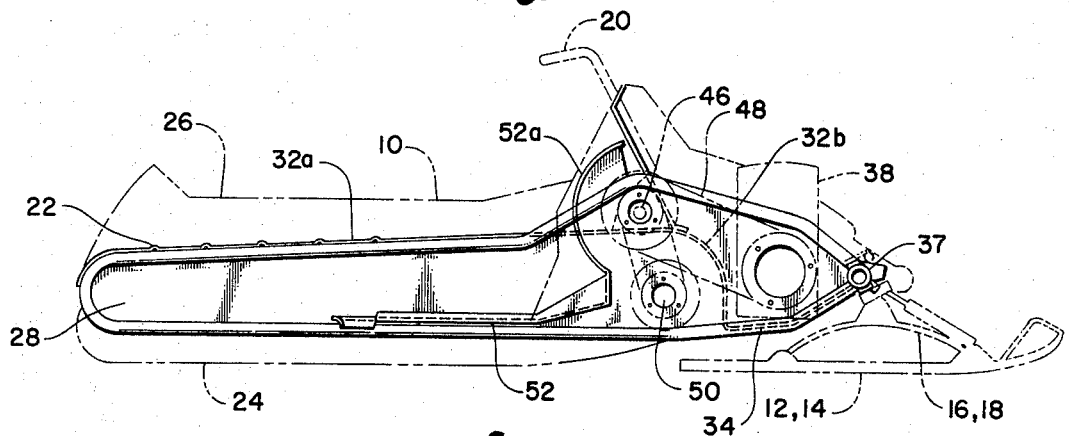
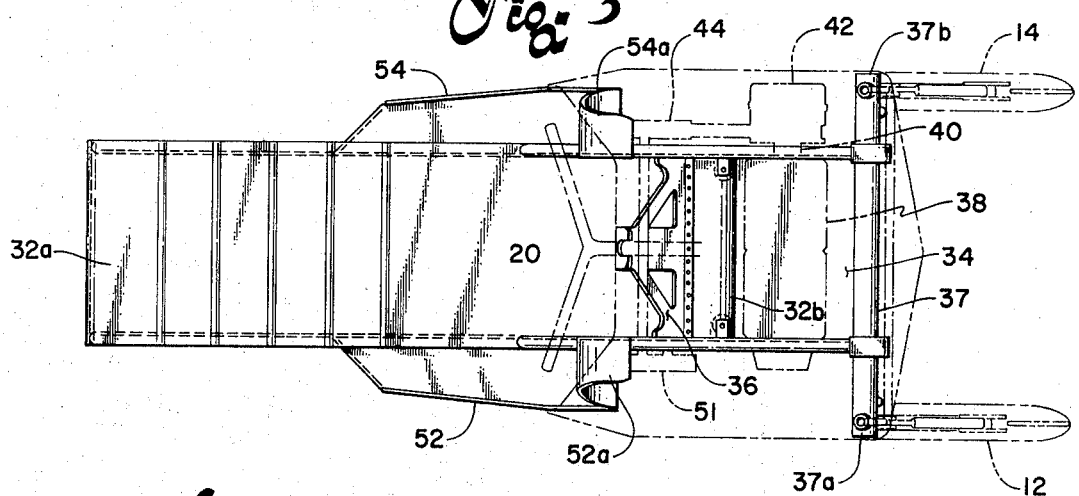
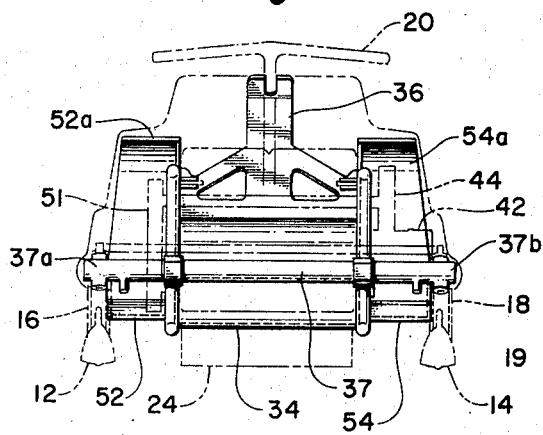

SNOWMOBILE FRAME

BACKGROUND OF THE INVENTION:

This invention relates to a frame assembly for a snowmobile.

The prior art snow vehicle frame consisted of a rear portion comprised of an inverted channel-shaped plate and a front portion comprised of a front flange and a bottom plate secured to the rear portion. The engine of the snowmobile was secured to the front portion by means of various plates and brackets. Likewise, other components of the drive train such as the drive clutch, driven clutch, chain case and axles and other components were mounted on the front portion by means of various brackets and plates. Thus, the prior art frame required a large number of oddly-shaped parts and resulted in an overall complicated configuration. Because of the large number of individual parts, structural rigidity was often less than desired and it was often difficult to maintain proper alignment of the various components of the drive train. In addition, because of the bottom plates required to attach the engine to the front portion of the snowmobile, the engine sat relatively high off the ground and resulted in a general raising of the center of gravity of the vehicle.

SUMMARY OF THE INVENTION:

The present invention provides a snowmobile frame having two side panels extending longitudinally along substantially the entire length of the body. The side panels are preferably surrounded by a peripheral tube or other member that enhances structural rigidity. The frame is much simpler to produce that prior art frames because it eliminates many of the auxiliary plates and brackets and the complicated configuration between the rear portion and forward portion of the frame. The engine is mounted directly on and between the side panels, allowing for a lower center of gravity of the vehicle and also providing additional structural rigidity because the engine actually becomes a structural member in the frame. In addition, the direct contact of the engine crankcase with the side panels allows engine heat to be conducted away from the engine, the frame, in effect, becoming a "heat sink" for the engine heat. Other components of the drive train are likewise mounted directly on the side plates insuring better alignment of the components.

BRIEF DESCRIPTION OF THE DRAWINGS:

FIG. 1 is a perspective view of a frame assembly embodying the invention with several other parts of a snowmobile shown in phantom;

FIG. 2 is a side elevational view thereof;

FIG. 3 is a top plan view thereof;

FIG. 4 is a front elevational view thereof.

DESCRIPTION OF THE PREFERRED EMBODIMENTS

Referring to the drawings, wherein like reference numerals are used throughout the several views to indicate like elements of the invention, a snowmobile 10 has a pair of steerable front skis 12 and 14 which is secured through a spring suspension system 16 and 18 respectively and which is controlled by a pair of handlebars 20. The skis partially support the front portion of the vehicle.

Rear portion 22 of the vehicle is supported by a suspension system including a ground-engaging endless tread 24 (shown in phantom) of any type well-known in the snowmobile art. A seat cushion 26 forms the top of the rear portion 22 of the vehicle.

In accordance with the invention, the frame of the vehicle includes a pair of spaced-apart elongated side panels 28 each of which extends in a single plane throughout substantially the entire length of the vehicle. Preferably, the planes of the panels 28 are parallel to each other. To add rigidity to the panels, stiffening members such as tubes 30 extend around the periphery of the side panels 28.

A transverse panel indicated generally by the numeral 32 extends between the side panels 28. A rear portion 32a of the transverse panel is disposed horizontally between the rear portions of the side panels 28 and supports the seat 26. A forward portion 32b separates the engine compartment 34 from the drive tread 24 area and forms the bottom of the engine compartment. A handlebar frame 36 is secured to the forward portion 32b of the transverse panel and the side panels 28. A transverse front support 37, preferably tubular, extends between the front ends of side panels 28 and laterally outwardly beyond each side panel. Near the ends of the front support 37 are mounting means 37a and 37b for securing the springs 16 and 18 of the skis 12 and 14 to the body.

The typical snowmobile has an engine 38 which delivers power through a drive shaft 40 to a transmission, a typical type of which would include a drive clutch 42 mounted on a drive axle 40 and a driven clutch 44 mounted on live axle 46 and driven by suitable means such as a belt 48. Power is transmitted to the drive shaft 50 by suitable drive means such as a chain and sprocket arrangement enclosed in an oil bath in a chain case 51—well known in the art. Suitable sprockets on drive shaft 50 transmit power to the drive tread 24.

A pair of foot rests 52 and 54 are secured to the side panels 28, preferably by welding. At the forward ends of the foot rests 52 and 54 are formed upwardly extending guard means 52a and 54a to shield the driver from the various drive means. Preferably, the foot rests and guard means are formed from a single piece of material, such as metal.

It should be apparent the structure described provides the advantages mentioned hereinabove. More particularly, the drive shaft 40 of the engine 38 is journaled in bearing means secured directly to the side panels 28 and thus no bottom support plate is required to mount the engine. Because the engine 38, through the drive shaft 40, is in direct contact with the side panels 28, heat from the engine is readily conducted to the side panels and thus they act as a heat sink for engine heat. Because the engine is itself a rigid member, it also enhances the rigidity of the frame structure. In addition, because the shafts for the drive clutch 42, driven clutch 44 and the chain case 51 are all journaled in bearings or other suitable means mounted directly on the side panels 28, the likelihood that these components will become misaligned is diminished.

The invention and many of its advantages will be understood from the foregoing description and it will be apparent that various changes may be made in the form and construction thereof without departing from the spirit and scope of the invention or sacrificing its mate-

I claim:

1. In a snowmobile having a forward portion substantially supported by steerable ski means attached to said forward portion, a rear portion having a seat and being supported by a suspension system including a ground-engaging endless drive tread and a forwardly located engine compartment, an improvement in a body frame comprising:

a pair of spaced-apart elongated side panels, each side panel extending longitudinally in a single plane along the rear portion of said snowmobile and along the forward portion thereof to a point approximately in line with the attachment of said ski means to said forward portion, each of said side panels including a stiffening member around the periphery thereof, a transverse panel extending laterally between said side panels, said transverse panel having a rearward portion disposed between rear portions of said side panels for supporting said seat and having a forward portion for separating said engine compartment from said drive tread area while forming the bottom of said engine compartment, and a drive clutch assembly operatively mounted directly on one of said side panels.

2. The apparatus of claim 1 wherein each of said stiffening members is tubular.

3. The apparatus of claim 1 wherein the planes defined by the side panels are in parallel relationship to each other.

4. The apparatus of claim 1 including a transverse front support extending laterally between the front ends of said side panels and laterally outwardly beyond said side panels to accommodate means for securing said ski means to said frame.

5. In a snowmobile having a forward portion substantially supported by steerable ski means attached to said forward portion, a rear portion having a seat and being supported by a suspension system including a ground-engaging endless drive tread and an engine mounted within a forwardly located engine compartment, an improvement in a body frame comprising:

a pair of spaced-apart elongated side panels, each side panel extending longitudinally in a single plane along the rear portion of said snowmobile and along the forward portion thereof to a point approximately in line with the attachment of said ski means to said forward portion and a transverse panel extending laterally between said side panels, said transverse panel having a rearward portion disposed between rear portions of said side panels and supporting said seat and a forward portion separating said engine compartment from said drive tread area and forming the bottom of said engine compartment; a transverse front support extending laterally between and beyond the front ends of said side panels; and an engine having a drive shaft mounted within said engine compartment, said drive shaft being journaled in bearing means directly on said side panels, thereby allowing said side panels to act as a heat sink for engine heat.

6. The apparatus of claim 1 wherein said drive clutch assembly includes a drive clutch, a driven clutch and a chain case, each of which is mounted through bearing means directly on said one of said side panels.

7. In a snowmobile having a forward portion substantially supported by steerable ski means attached to said forward portion, a rear portion having a seat and being supported by a suspension system including a ground-engaging endless drive tread and a forwardly located engine compartment, an improvement in a body frame comprising:

a pair of spaced-apart elongated side panels, each side panel extending longitudinally in a single plane along the rear portion of said snowmobile and along the forward portion thereof to a point approximately in line with the attachment of said ski means to said forward portion, each of said side panels including a stiffening member around the periphery thereof, and a drive clutch, a driven clutch, and a chain case, each of which is mounted through bearing members directly on one of said side panels.

* * * * *